United States Patent [19]

Simon

[11] Patent Number: 4,577,371
[45] Date of Patent: Mar. 25, 1986

[54] MACHINE FOR PEELING, SKIMMING, SKINNING AND/OR SLICING JOINTS OF MEAT, FISHES AND THE LIKE

[76] Inventor: Gilbert Simon, 475, rue Caroline, app. 20, Longueuil, Quebec, Canada, J4H 3L7

[21] Appl. No.: 683,467

[22] Filed: Dec. 19, 1984

[51] Int. Cl.⁴ .............................................. A22C 25/17
[52] U.S. Cl. ............................................. 17/62; 17/21
[58] Field of Search ............... 17/62, 21; 99/588, 589

[56] References Cited

U.S. PATENT DOCUMENTS 3,769,903  11/1973  Greider .............................. 17/62 X
3,931,665   1/1976  Townsend ............................ 17/21

FOREIGN PATENT DOCUMENTS 970663   7/1975  Canada ................................ 17/21
2475855   8/1981  France ................................ 17/21
2528666  12/1983  France .

*Primary Examiner*—Willie G. Abercrombie
*Attorney, Agent, or Firm*—Schwartz, Jeffery, Schwaab, Mack, Blumenthal & Evans

[57] ABSTRACT

A machine for peeling, skimming, skinning and/or slicing a cut of meat or fish, which machine comprises a central compartment in which are transversally mounted a cutting blade attached to a pivotable blade support, a drive roller mounted in cooperative relationship with respect to the blade for pushing toward said blade a cut of meat or fish, a comb and, optionally, a brush for cleaning the roller. The machine also comprises a pair of lateral compartments located on both sides of the central compartment, these lateral compartments being tight and containing a driving chain for rotating the roller and the brush. One of these lateral compartments also contains a control member for adjusting the position of the pivotable blade support. This blade support is mounted in the central compartment in such a manner that the upper surface of the drive roller is always located at a level slightly higher than the level of the blade to make the operation of the machine safer. The machine further comprises a cylindrical container in which are tightly and removably mounted an electrical motor operatively connected to the driving chain, and other electrical components necessary for operating the machine. This cylindrical container rigidly extends across the central compartment between said lateral compartment, thereby reinforced in the same.

10 Claims, 11 Drawing Figures

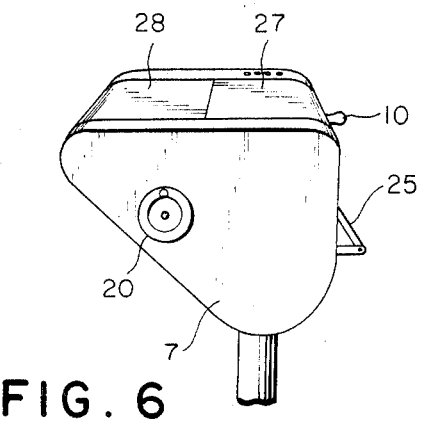
FIG. 6
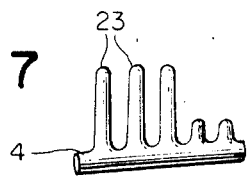
FIG. 7
FIG. 8
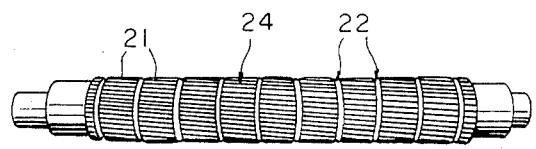
FIG. 9
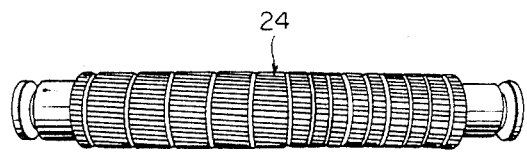
FIG. 11
FIG. 10
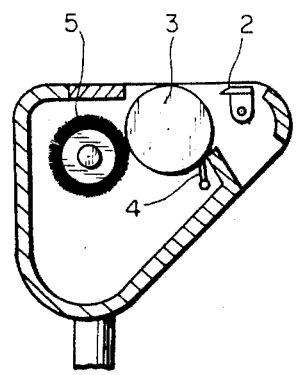

4,577,371

MACHINE FOR PEELING, SKIMMING, SKINNING AND/OR SLICING JOINTS OF MEAT, FISHES AND THE LIKE

The present invention relates to a machine for peeling, skimming, skinning and/or slicing a cut of meat or fish.

Machines of the above mentioned type are already known, which comprise a cutting blade working in cooperative relationship with a drive roller to peel, skim, skin or slice the cut of meat or fish to be peeled, skimmed, skinned or sliced. The known machines also comprise built-in means for cleaning the roller.

The main drawback of these known machines is that they are not as safe as they should be for their operators sake, especially with respect to their handling and to electrical shock hazards. Indeed, the operator must, in use, push with his hands the cut from a working table forming part of the machine, toward the blade, such a pushing being in itself dangerous. Moreover, as the machine is intended to be used in a medium wherein its driving mechanism gets easily dirty and electrical short-circuits may be easily generated, the operator is facing a permanent risk of electrical shock hazard, thereby making it necessary for a specialized labour to clean the machine regularly.

The object of the present invention is to provide a machine for peeling, skimming, skinning and/or slicing cuts of meat of fish, which machine overcomes the above mentioned drawback.

More particularly, the object of the present invention is to provide a machine in the above mentioned type, which machine comprises a central compartment in which are transversally mounted a cutting blade attached to a pivotable blade support, a drive roller mounted in cooperative relationship with respect to the blade for pushing toward said blade a cut of meat or fish, and a comb for cleaning the roller. The machine also comprises a pair of lateral compartments located on both sides of the central compartment, these lateral compartments being tight and containing means for driving the roller and means for controlling the operation of the machine from the outside. One of these lateral compartments also contains a control member for adjusting the position of the pivotable blade support. This blade support is mounted in the central compartment in such a manner that the upper surface of the drive roller is always located at a level slightly higher than the level of the blade to make the operation of the machine safer. The machine further comprises a cylindrical container in which are tightly and removably mounted an electrical motor operatively connected to said driving means and other electrical components necessary for operating the machine. This cylindrical container rigidly extends across the central compartment between said lateral compartment, thereby reinforced in the same.

Advantageously, the drive roller may be provided with groups of serrated rings of different size to facilitate the operation of the machine while making its possibilities of application wider in scope.

Other features and advantages of the machine according to the invention will be better understood with reference to the following, non restrictive description of a preferred embodiment thereof, taken in connection with the accompanying drawings wherein.

Figure 1:
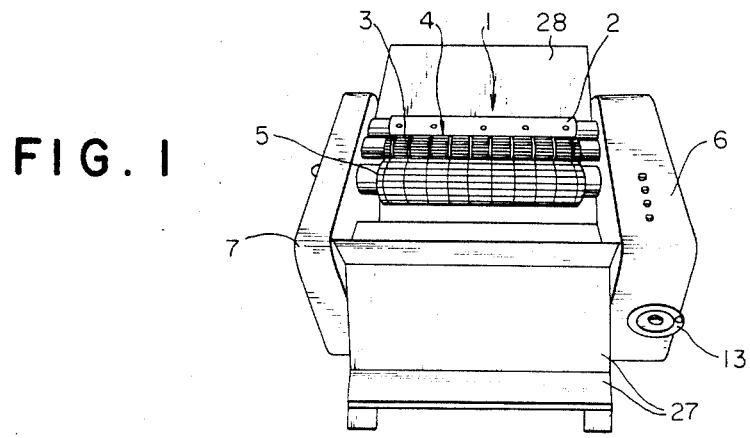
FIG. 1 is a perspective view of a machine according to the invention seen from the operator's side, this machine having its working table shown in open position.
Figure 2:
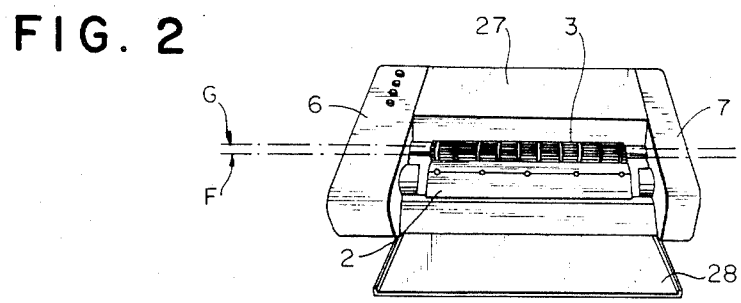
FIG. 2 is a perspective view of the machine of FIG. 1 seen from its other side.
Figure 3:
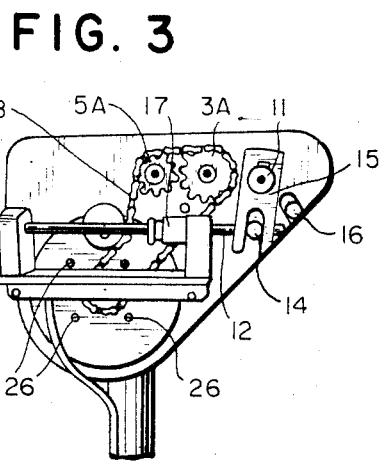
FIG. 3 is a side elevational view of the inside of one of the lateral compartment of the machine.
Figure 5:
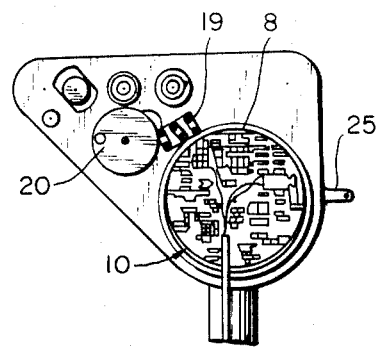
Figure 4:
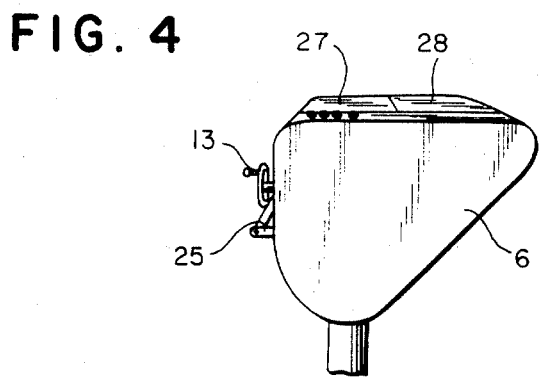
FIG. 4 is a side perspective view of the machine with the compartment shown in FIG. 3 in closed position.

FIG. 5 appearing on the same sheets of drawings as FIGS. 1 to 3, is a side elevational view of the inside of the other lateral compartment of the machine;

FIG. 6 is a side perspective view of the machine showing the compartment shown in FIG. 5 in closed position;

FIG. 7 represents a portion of a comb for use in the machine;

FIGS. 8 to 10 represent different embodiments of drive rollers for use in the machine; and FIG. 11 is a side elevational view of the central compartment of the machine.

The machine for peeling, skimming, skinning and/or slicing a cut of meat or fish as shown in the accompanying drawings, comprises a central compartment 1 in which are transversally mounted a cutting blade 2 attached to a pivotable blade support, a drive roller 3, a comb 4 and a rotating brush 5. A pair of lateral compartment 6 and 7 are located on both sides of the central compartment 1. These lateral compartments are tight and contain means for driving the roller 3 and means for controlling the operation of the machine from the outside.

A cylindrical container 8 acting as a reinforcing beam, extends across the central compartment 1 between the lateral compartments 6 and 7. This cylindrical container is intended to receive in a tight and removable manner, an electrical motor whose driving shaft 9 (see FIG. 3) is operatively connected to the driving means contained in the lateral compartment 6. The cylindrical container 6 also contains other electrical components 10 for use in controlling the operation of machine.

The support of the blade 2 is rotatably mounted about a pivot 11 and a control member is provided for adjusting the position of this support. This control member comprises an endless screw 12 operated from the outside of the machine by a hand-wheel 13. The endless screw 12 drives a block 14 slidably mounted between the legs of a fork 15 solid with the support of the blade 2. A stop 16 is provided to limit the rotational movement of the blade support. The endless screw 12 is rotatably mounted inside the lateral compartment 6 on a block 17 made of resilient material to give some slack to the blade support.

The drive roller 3 and the rotating brush 4 are rotated by the motor by means of a driving chain 18 driven by the shaft 9 of the motor and passing over a first sprocket 3a connected to the shaft of the roller 3 and a second sprocket 5a connected to the shaft of the rotating brush 5.

As shown in FIG. 3, the control member used for adjusting the position of the blade 2 and the chain 18 used for driving the roller and brush are tighthy located in the same lateral compartment 6.

The other compartment 7 contains, in tight manner, a return spring 19 connected to the comb 4 and means operable from the outside of the machine by a hand-wheel 20 for pulling the comb in a direction opposite to its return-spring to facilitate its cleaning and its removal whenever necessary.

As shown in FIG. 2, the support of the blade 2 is mounted in the central compartment 1 in such a manner that the upper surface C of the drive roller is always located at a level slightly higher than the level of the edge F of the blade 2 to protect the hands of the operator when the same is pushing the meat of fish to be cut towards the blade.

The drive roller 3 comprises a plurality of rings 21 axially spaced apart, these ring defining therebetween grooves 22 in which are inserted the teeth 23 of the comb 4. Advantageously, these teeth 23 are round tipped and the interspaces between these teeth are round-shaped as shown in FIG. 7, to reduce as much as possible a microbial infestation and facilitate cleaning of the comb.

The drive roller 3 may comprise a plurality of rings having the same width as shown in FIG. 8, or at least two groups of rings, the rings of each group being identical in width to each other but different in width from the rings of the other group as shown in FIG. 9. Such an arrangement of the rings in different groups of rings of different widths advantageously permits to use part of the roller containing one group of rings to remove fats or nerves from the cut of meat while the other part of the roller may be used to <<finish>> the cut without removing, overheating or marking the surface of the meat that can be beef, horsemeat, veal, lamb, pork, fishes or offals. The drive roller as shown in FIG. 9 advantageously permits to treat food substances that have always been recognized as being very difficult to skin with a skinning machine, such as sea skates, sea dogs and sea veals.

If desired, the drive roller 3 may comprise a pair of smooth rings as shown in FIG. 10.

However, the roller will preferably comprise helicoidal serrations 24 as shown in FIGS. 8 to 9, such serrations being particularly useful for treating fishes and horse meat.

The operation of the machine is controlled by a horizontal bar 25 mounted so as to be operated by a mere pressure exerted by the legs of an operator standing up in front of the machine. Advantageously, the operation of the bar 25 can be made in two steps to make the machine safer in use. The hand-wheel 10 permits to adjust the position of the support of the blade 2 from its limit position where the fork 15 is in contact with the stop 16. This limit position can be used, for example, to remove nerves from a cut of meat. By rotating the hand-wheel 10, it is possible to reduce the gap between the roller and the cutting blade, thereby making the machine useful for skimming or slicing cuts of meat. Of course, such an adjustment has to be manually made by the operator according to his own requirement.

Advantageously, the support of the blade 2, the roller 3 and the rotating brush 5 are rotatably mounted on half-bearings to facilitate removal and change of the blade, roller and brush by the operator himself in a very fast manner without necessity of calling for a specialized labour.

Besides, removal of four bolts 26 accessible from the outside of the body of the machine permits to remove the motor after having disconnected the electrical components shown in FIG. 5. These electrical components and the motor are intended to be removed from the same side of the machine.

The comb 4 is also advantageously made removable and interchangeable.

The machine comprises a working table 29. It may also comprise an additional working table 28 slightly inclined upwardly to receive and support the meat or fish after it has been cut.

A counter-roller also mounted onto half-bearings (not shown), can also be provided into the central compartment to bear against and thus reinforce the roller 3. This counter-roller may be operated by a wheel handle to prevent accident.

As can be understood, the above machine is generally designed to be easily cleaned without having to completely dismantle it. This machine is also designed to protect the motor and the electrical components. Advantageously, all the angles of the body of the machine can be round shaped to make its cleaning easier.

Of course, the machine can be provided, as most of the machines of the same type, with a detachable tray (not shown) for receiving the waste.

I claim:

1. A machine for peeling, skimming, skinning or slicing a cut of meat or fish, of the type comprising:
   a cutting blade;
   a drive roller mounted in cooperative relationship with respect of the blade for pushing towards said blade the cut of meat or fish to be peeled, skimmed, skinned or sliced, and
   means for cleaning the roller;
   said machine being characterized in that it further comprises:
   a central compartment in which are transversally mounted the blade, the drive roller and said means for cleaning the roller, said blade being mounted on a pivotable blade-support, said cleaning means comprising a comb in contact with said roller;
   a pair of lateral compartments located on both sides of the central compartment, said lateral compartments being tight and containing means for driving the roller and means for controlling the operation of the machine from the outside, one of said lateral compartment also containing a control member for adjusting the position of the pivotable blade support;
   said blade support being mounted in the central compartment in such a manner that the upper surface of the drive roller is always located at a level slightly higher than the level of the blade to make the machine safer in use;
   said machine further comprising a cylindrical container in which are tightly and removably mounted an electrical motor operatively connected to said driving means, and other electrical components necessary for operating the machine, said cylindrical container rigidly extending accross the central compartment between said lateral compartments.

2. A machine as claimed in claim 1, wherein the control member for adjusting the position of the pivotable blade support comprises an endless screw operated from the outside of the machine, said endless screw driving a block slidably mounted in a fork solid with the blade support, the rotational position of said blade support being limited by at least one stop.

3. A machine as claimed in claim 2, wherein the endless screw is rotatably mounted on a resilient support to give some slack to the blade support.

4. A machine as claimed in claim 1, wherein said means for cleaning the roller also comprises a rotatable brush and wherein the control member for adjusting the position of the pivotable blade support and said means for driving the roller are located in the same lateral compartment, together with means for rotating the brush.

5. The machine as claimed in claim 4, wherein the other lateral compartment contains a return-spring connected to the comb and means operable from the outside of the machine for moving the comb in a direction opposite to its return spring to facilitate cleaning or removal of said comb whenever necessary.

6. A machine as claimed in claim 5, wherein the comb has round-tipped teeth and round-shaped interspaces to reduce as much as possible microbial infestation.

7. A machine as claimed in claim 1, wherein the drive roller comprises a plurality or rings axially spaced apart, said rings defining therebetween grooves in which are inserted the teeth of the comb.

8. A machine as claimed in claim 7, wherein the drive roller comprises at least two groups of rings, the rings of each group being identical in size to each other but different in size from the rings of the other group.

9. A machine as claimed in claim 1, wherein the drive roller comprises helicoical serrations all over its surface.

10. A machine as claimed in claim 1, wherein the pivotable blade support, the drive roller and the rotating brush are removably mounted on half-bearings and wherein the electrical supply to the motor of the machine is controlled by a bar extending transversally in front of the machine at the level of the legs of the operator, power being supplied to said electrical motor only when a pressure is exerted against said bar.

* * * * *